(12) United States Patent
Murakami et al.

(10) Patent No.: US 10,505,410 B2
(45) Date of Patent: Dec. 10, 2019

(54) ROTARY ELECTRIC MACHINE HAVING BOLT PASSAGE MEMBERS

(71) Applicant: Mitsubishi Electric Corporation, Chiyoda-ku, Tokyo (JP)

(72) Inventors: Tadashi Murakami, Chiyoda-ku (JP); Kouichi Ojima, Chiyoda-ku (JP); Shinji Nishimura, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 639 days.

(21) Appl. No.: 14/251,750

(22) Filed: Apr. 14, 2014

(65) Prior Publication Data
US 2015/0130311 A1 May 14, 2015

(30) Foreign Application Priority Data
Nov. 8, 2013 (JP) ................. 2013-231828

(51) Int. Cl.
*H02K 1/18* (2006.01)
*H02K 1/14* (2006.01)
*H02K 15/14* (2006.01)
*H02K 5/04* (2006.01)

(52) U.S. Cl.
CPC .............. *H02K 1/185* (2013.01); *H02K 1/148* (2013.01); *H02K 15/14* (2013.01); *Y10T 29/49009* (2015.01)

(58) Field of Classification Search
CPC .......... H02K 1/18; H02K 1/185; H02K 1/141; H02K 1/148; H02K 5/04; H02K 5/22

USPC .... 310/89, 91, 418, 428, 430, 432, 216.008, 310/216.009
See application file for complete search history.

(56) References Cited

U.S. PATENT DOCUMENTS

| 5,196,749 A | * | 3/1993 | Palma | H02K 1/185 310/216.039 |
| 2002/0117920 A1 | * | 8/2002 | Trowbridge | H02K 5/00 310/89 |
| 2013/0062977 A1 | * | 3/2013 | Watanabe | H02K 9/19 310/61 |

FOREIGN PATENT DOCUMENTS

| JP | 4678515 B2 | 4/2011 |
| WO | 2011/080817 A1 | 7/2011 |

* cited by examiner

*Primary Examiner* — Michael Andrews
(74) *Attorney, Agent, or Firm* — Sughrue Mion, PLLC; Richard C. Turner (57) ABSTRACT

A plurality of core blocks that are arranged into an annular shape are inserted into and fixed to a cylindrical frame, and are disposed inside the frame, a bolt passage member that is produced as a solid body and that has a bolt passage aperture that passes through in a longitudinal direction is fixed by welding to an outer circumferential surface of the frame such that the longitudinal direction thereof is oriented in the axial direction of the frame, and a stator is held on the housing by fastening a bolt that is passed through the bolt passage aperture into a fixing portion that is formed on the housing.

5 Claims, 6 Drawing Sheets

ROTARY ELECTRIC MACHINE HAVING BOLT PASSAGE MEMBERS

BACKGROUND OF THE INVENTION

1. Field of the Invention

The present invention relates to a rotary electric machine that is used in an automotive electric motor, etc., that is mounted to an automobile, for example, and to a method for manufacturing a rotary electric machine stator.

2. Description of the Related Art

In conventional rotary electric machines, a stator is housed inside a case such that a stator core is held by a cylindrical portion of a ring member, and is held on the case by fastening bolts that are passed through bolt passage apertures that are formed on flange portions that extend radially outward from a first end of the cylindrical portion into fixing portions that are formed on an outer circumferential side of a cylindrical portion of the case (see Patent Literature 1, for example).

In other conventional rotary electric machines, a stator is also secured by fastening to a case by bolts that are passed through bolt passage apertures that are formed on protruding portions that protrude radially from a stator core (see Patent Literature 2, for example).

CITATION LIST

Patent Literature

[Patent Literature 1] WO/2011/080817 (Pamphlet)
[Patent Literature 2] Japanese Patent No. 4678515 (Gazette)

In conventional rotary electric machines such as that described in Patent Literature 1, the bolt passage apertures are formed on flange portions that are bent from the first end of the cylindrical portion so as to protrude radially outward. Thus, because the regions of the flange portions that face bolt head portions overlap with the bend portions from the cylindrical portion if the bolt passage apertures are set too close to the cylindrical portion, it is impossible to ensure sufficient flange portion seat area for contact with the bolt seats, and it has been necessary to separate the positions of the bolt passage apertures radially outward from the cylindrical portion. In order to ensure fastening force from the bolts, it has also been necessary to increase wall thickness around the screw-threaded apertures of the fixing portions to which the bolts are fastened. However, because the aperture positions of the bolt passage apertures cannot be displaced radially outward if installation space is limited, one problem has been that the diameter of the stator core must be reduced in order to ensure flange portion seat area and increase the wall thickness around the screw-threaded apertures of the fixing portions, reducing performance of the rotary electric machine.

In other conventional rotary electric machines such as that described in Patent Literature 2, because a laminated core in which gaps arise between laminated segments is fastened directly to the case, one problem has been that a set fastening force cannot be ensured for a long period of time.

SUMMARY OF THE INVENTION

The present invention aims to solve the above problems and an object of the present invention is to provide a rotary electric machine and a method for manufacturing a rotary electric machine stator that can suppress decreases in performance by producing a bolt passage member as a separate member from a frame to ensure seat area of the bolt passage member that contacts a bolt seat and to increase wall thickness around a screw-threaded aperture of a fixing portion without reducing a diameter of a stator core, and that can also ensure a set fastening force for a long period of time by producing the bolt passage member as a solid body.

In order to achieve the above object, according to one aspect of the present invention, there is provided a rotary electric machine including: a housing; a rotor that is rotatably disposed inside the housing; a stator that includes: a stator core that is configured by arranging a plurality of core blocks into an annular shape, the plurality of core blocks each being prepared by laminating and integrating a predetermined number of magnetic steel plates, and including a circular arc-shaped yoke portion, and a tooth portion that protrudes radially inward from an inner circumferential wall surface of the yoke portion; and coils that are wound onto the tooth portions of each of the plurality of core blocks, the stator being held on the housing so as to surround the rotor; a frame that is produced so as to have a cylindrical shape, the plurality of core blocks that are arranged into the annular shape being inserted into and fixed to an internal portion thereof; and a bolt passage member that is produced as a solid body, that is fixed to an outer circumferential surface of the frame by welding such that a longitudinal direction thereof is oriented in an axial direction of the frame, and that includes a bolt passage aperture that passes through in the longitudinal direction, wherein the stator is held on the housing by fastening a bolt that is passed through the bolt passage aperture from a first longitudinal end of the bolt passage member into a fixing portion that is formed on the housing.

According to the present invention, because the bolt passage member is produced as a separate member from the frame, an end surface of the bolt passage member constitutes a seat that contacts a bolt seat. Thus, because the bolt passage aperture can be set closer to the outer circumferential surface of the frame, seat area that contacts the bolt seat can be ensured without reducing the diameter of the stator core, enabling decreases in performance to be suppressed.

Because the fixing portion is positioned axially outside the stator core, wall thickness around the bolt fastening portion of the fixing portion can be ensured without reducing the outside diameter of the stator core, enabling decreases in performance to be suppressed.

In addition, because the bolt passage member is produced as a solid body, a set fastening force can be ensured initially and for a long period of time.

DETAILED DESCRIPTION OF THE PREFERRED EMBODIMENTS

Preferred embodiments of a rotary electric machine and a method for manufacturing a rotary electric machine stator according to the present invention will now be explained with reference to the drawings.

Embodiment 1

Figure 1:
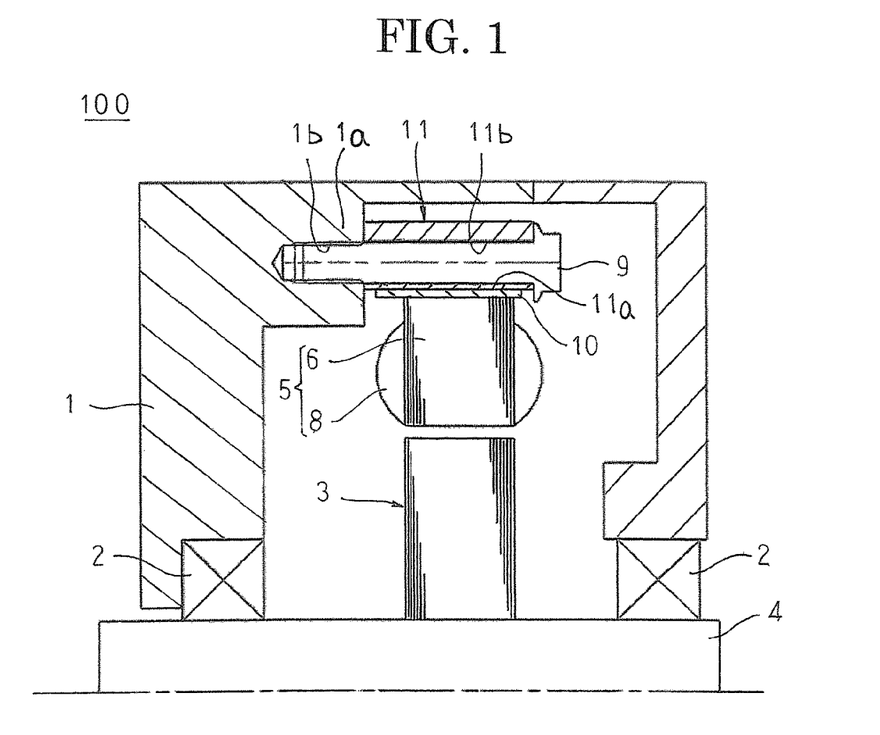
FIG. 1 is a half section that shows a rotary electric machine according to Embodiment 1 of the present invention.
Figure 2:
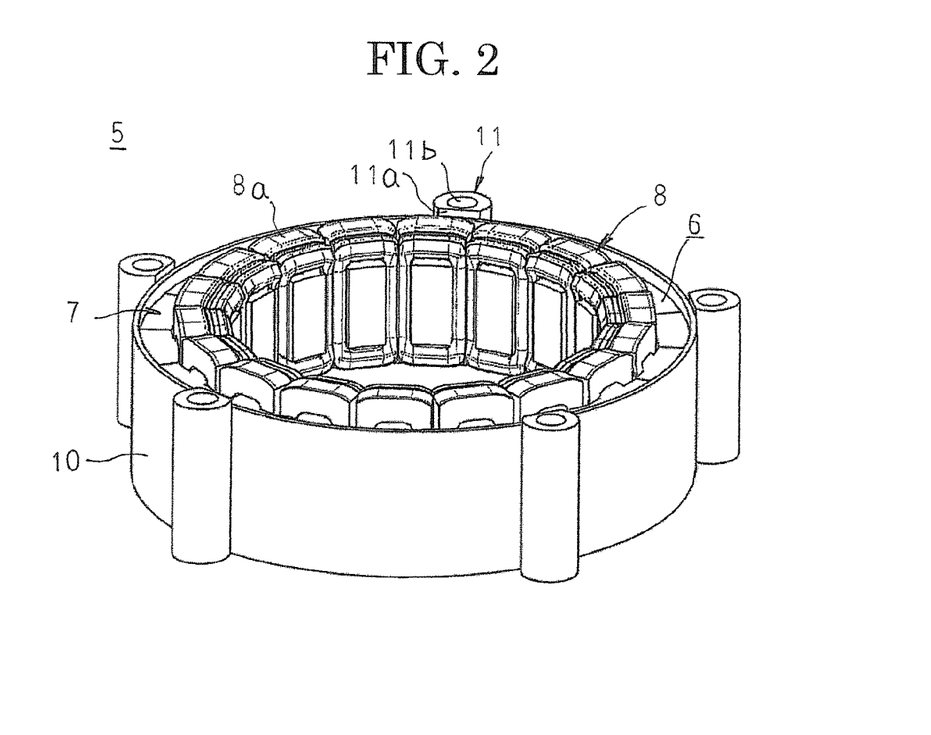
FIG. 2 is a perspective that shows a stator in the rotary electric machine according to Embodiment 1 of the present invention.
Figure 3:
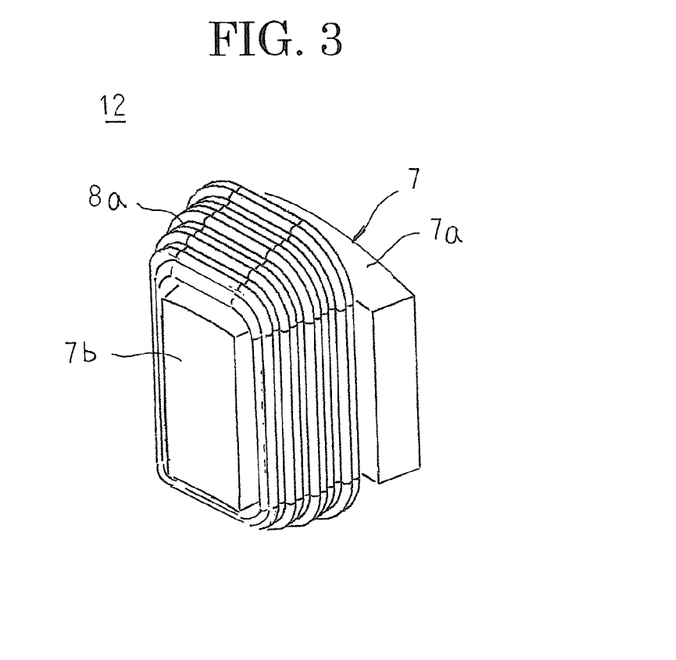
FIG. 3 is a perspective that shows a coil assembly in the rotary electric machine according to Embodiment 1 of the present invention.
Figure 4:
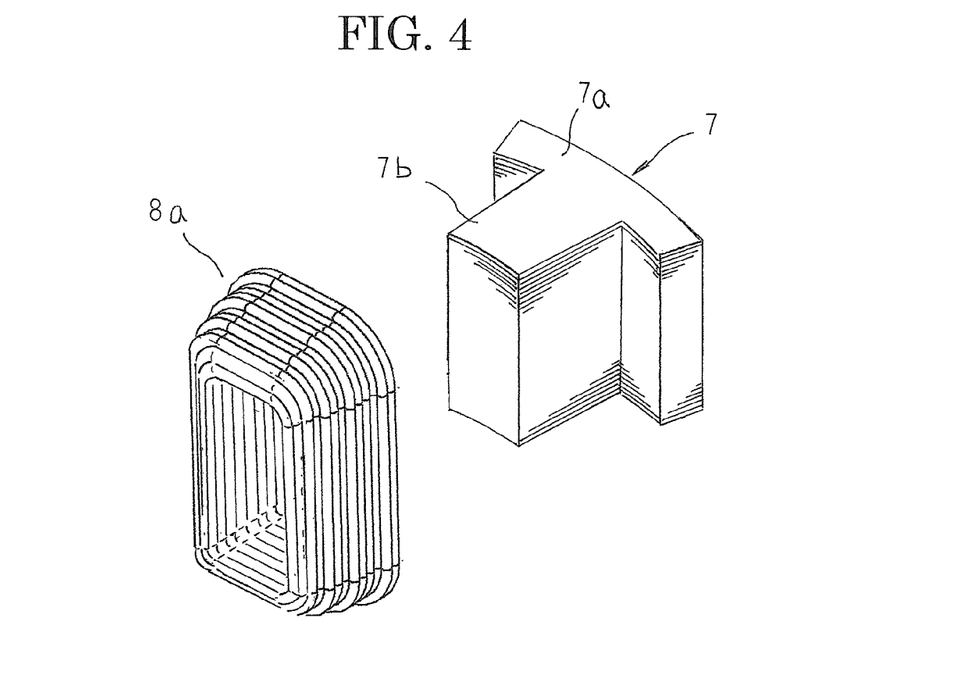
FIG. 4 is an exploded perspective that shows a coil assembly in the rotary electric machine according to Embodiment 1 of the present invention.
Figure 5:
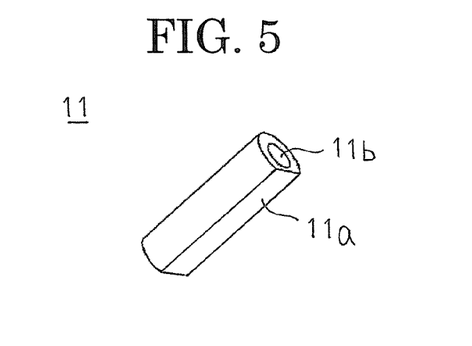
FIG. 5 is a perspective that shows a bolt passage member in the rotary electric machine according to Embodiment 1 of the present invention.

FIG. 1 is a half section that shows a rotary electric machine according to Embodiment 1 of the present invention, FIG. 2 is a perspective that shows a stator in the rotary electric machine according to Embodiment 1 of the present invention, FIG. 3 is a perspective that shows a coil assembly in the rotary electric machine according to Embodiment 1 of the present invention, FIG. 4 is an exploded perspective that shows a coil assembly in the rotary electric machine according to Embodiment 1 of the present invention, and FIG. 5 is a perspective that shows a bolt passage member in the rotary electric machine according to Embodiment 1 of the present invention.

In FIG. 1, a rotary electric machine 100 includes: a housing 1 on which fixing portions 1a are formed; a shaft 4 that is rotatably supported in the housing 1 by means of bearings 2; a rotor 3 that is fixed to the shaft 4 so as to be rotatably disposed inside a frame; and a stator 5 that is held by the housing 1 so as to be disposed around a circumference of the rotor 3 so as to be coaxial to the rotor 3 and so as to have an air gap interposed. The fixing portions 1a have flat seating surfaces that are perpendicular to the central axis of the shaft 4 and are oriented toward a first axial end, and internal screw thread portions 1b are formed into the seating surfaces of the fixing portions 1a.

Next, configuration of the stator 5 will be explained with reference to FIGS. 2 through 5.

As shown in FIG. 2, the stator 5 includes: a stator core 6 that is configured into an annular shape by arranging eighteen core blocks 7 in a row circumferentially; and a stator coil 8 that is constituted by concentrated winding coils 8a that are wound onto respective tooth portions 7b of the core blocks 7.

As shown in FIG. 4, the core blocks 7 are produced by laminating and integrating magnetic segments that have been punched from a thin electromagnetic steel sheet, and are configured into approximate T shapes that are constituted by a circular arc-shaped yoke portion 7a and a tooth portion 7b that protrudes radially inward from an inner circumferential wall surface of the yoke portion 7a. The concentrated winding coils 8a are produced by winding a conductor wire a plurality of times onto the tooth portion 7b, the conductor wire being constituted by a copper wire that is coated with an insulator.

The frame 10 is produced into a cylindrical body by curling a metal plate, abutting together end surfaces thereof, and joining the abutted portion thereof by TIG welding, for example. An axial length of the frame 10 is longer than a length in a direction of lamination (axial length) of the core blocks 7. As shown in FIG. 5, bolt passage members 11 are produced into tubular bodies by forging, for example. A length (axial length) of the bolt passage members 11 is slightly longer than the axial length of the frame 10. A mounting surface 11a is formed so as to extend on a portion of an outer circumferential surface of the bolt passage members 11 from a first axial end to the second end. This mounting surface 11a is a curved surface that has an identical radius of curvature to an outer circumferential surface of the frame 10. In addition, two axial end surfaces of the bolt passage members 11 are formed into flat surfaces that are perpendicular to an axial direction.

To assemble a stator 5 that is configured in this manner, the concentrated winding coils 8a are first wound onto the tooth portions 7b to assemble the coil assemblies 12 that are shown in FIG. 3. Next, eighteen coil assemblies 12 are arranged into an annular shape by abutting together circumferential side surfaces of the yoke portions 7a. Next, the group of coil assemblies 12 that are arranged into the annular shape is inserted into and fixed to the frame 10 by press fitting or shrinkage fitting. Next, the mounting surfaces 11a are respectively placed on the outer circumferential surface of the frame 10 such that aperture directions of the bolt passage apertures 11b are parallel to the axial direction of the frame 10 and two axial end portions protrude axially outward from the frame 10, and the bolt passage members 11 are joined to the frame 10 by TIG welding. A stator 5 in which five bolt passage members 11 are disposed on the outer circumferential surface of the frame 10 at a uniform angular pitch circumferentially is thereby assembled, as shown in FIG. 2. Then, the bolts 9 are passed through the bolt passage apertures 11b from the first axial end of the bolt passage members 11, and fastened into the internal screw thread portions 1b that are formed on the fixing portions 1a of the housing 1 to hold the stator 5 on the housing 1, as shown in FIG. 1.

In Embodiment 1, because the bolt passage members 11 are produced as separate members from the frame 10, the end surfaces of the bolt passage members 11 constitute first seats that the seats of the head portions of the bolts 9 (the bolt seats) contact. Thus, when the bolt passage members 11 are joined onto the outer circumferential surface of the frame 10 by welding, the bolt passage apertures 11b can be set closer to the outer circumferential surface of the frame 10 compared to Patent Literature 1, in which bolt passage apertures are formed on flange portions in which a cylindrical frame is bent near a first end so as to protrude radially outward. In other words, if the radial positions of the aperture positions of the bolt passage apertures 11b are equal, then the outside diameter of the frame 10 of the present configuration can be increased compared to Patent Literature 1, enabling the outside diameter of the stator core 6 to be increased. Thus, if the size of the rotary electric machine is equal, the outside diameter of the stator core 6 (the stator 5) can be increased compared to Patent Literature 1, enabling the performance of the rotary electric machine 100 to be increased. Consequently, even if the rotary electric machine 100 is applied to applications that require space saving in installation space, such as electric automobiles or hybrid automobiles, decreases in performance of the rotary electric machine 100 can be suppressed.

Because the internal screw thread portions 1b of the housing 1, which are fastening portions for the bolts 9, are positioned axially outside the stator 5, the wall thickness around the internal screw thread portions 1b can be ensured without increasing the outside diameter of the rotary electric machine 100, and without reducing the outside diameter of the stator 5. Consequently, even if the rotary electric machine 100 is applied to applications that require space saving in installation space, such as electric automobiles or hybrid automobiles, decreases in performance of the rotary electric machine 100 can be suppressed.

Because the bolt passage members 11 are joined onto the outer circumferential surface of the frame 10 by welding, costs can be reduced compared to when the bolt passage members 11 and the frame 10 are formed integrally.

Because the bolt passage members 11, which are produced as solid bodies, are fastened to the housing 1 by the bolts 9, a set fastening force can be ensured initially and for a long period of time compared to Patent Literature 2, in which a laminated core is fastened directly to a case.

Because the bolt passage members 11 are welded onto the frame 10 into which the group of the coil assemblies 12 that are arranged into an annular shape is inserted and fixed, stresses that arise in the stator 5 will not become nonuniform. Because the mounting surface 11a that has a curved surface that has an identical radius of curvature to the outer circumferential surface of the frame 10 is formed on a portion of the outer circumferential surface of the bolt passage members 11 so as to extend from the first axial end to the second end, the bolt passage members 11 can be placed in a stable state on the outer circumferential surface of the frame 10, improving welding workability and welding reliability.

Because the concentrated winding coils 8a are wound onto the tooth portions 7b of each of the core blocks 7 before a step of arranging the core blocks 7 into an annular shape, the concentrated winding coils 8a can be wound onto each of the core blocks 7 to a high space factor, and to a space factor that does not have irregularities, enabling the performance of the rotary electric machine 100 to be increased.

Embodiment 2

Figure 6:
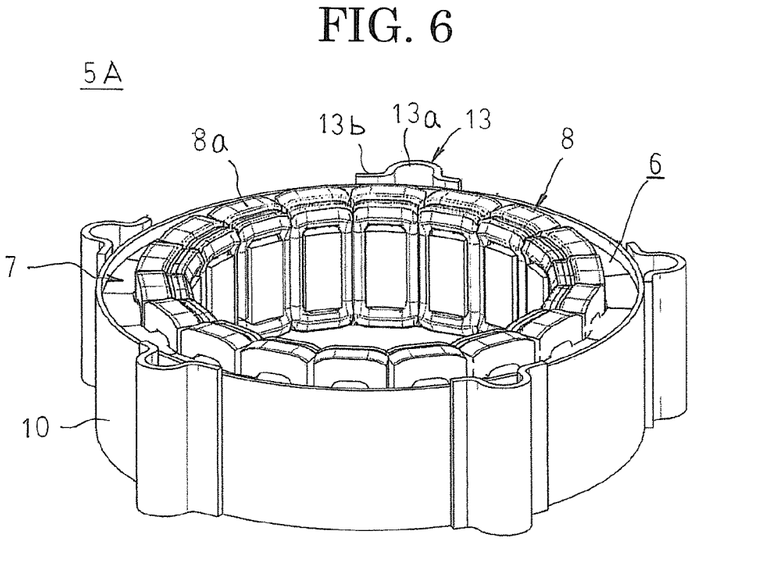
FIG. 6 is a perspective that shows a stator in a rotary electric machine according to Embodiment 2 of the present invention.
Figure 7:
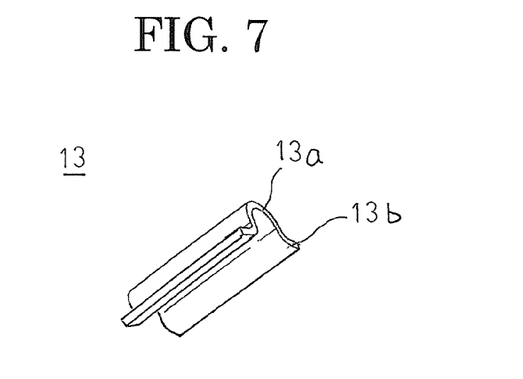
FIG. 7 is a perspective that shows a bolt passage member in the rotary electric machine according to Embodiment 2 of the present invention.

FIG. 6 is a perspective that shows a stator in a rotary electric machine according to Embodiment 2 of the present invention and FIG. 7 is a perspective that shows a bolt passage member in the rotary electric machine according to Embodiment 2 of the present invention.

In FIGS. 6 and 7, bolt passage members 13 are produced by bending sheet metal, and have: an approximately cylindrical bolt passage portion 13a in which a cross-sectional shape that is perpendicular to a longitudinal direction is a C shape, the cylindrical bolt passage portion 13a being longer than an axial length of a frame 10; and flange portions 13b that are formed so as to protrude outward on two sides of the bolt passage portion 13a from two end portions of the C-shaped cross section so as to extend in a longitudinal direction of the bolt passage portion 13a. Surfaces on an opposite side of the flange portions 13b from the bolt passage portion 13a are curved surfaces that have an identical radius of curvature to an outer circumferential surface of the frame 10. Furthermore, two longitudinal end surfaces of the bolt passage members 13 are formed into flat surfaces that are perpendicular to the longitudinal direction.

Core blocks 7 onto which concentrated winding coils 8a have been wound are arranged into an annular shape by abutting together circumferential side surfaces of yoke portions 7a, and are inserted into and fixed to the frame 10 by press fitting or shrinkage fitting. The flange portions 13b of the bolt passage members 13 are placed on the outer circumferential surface of the frame 10, and are joined to the frame 10 by spot welding to assemble a stator 5A. Bolt passage apertures are formed between the bolt passage portions 13a and the frame 10.

A stator 5A that is assembled in this manner is held on the housing 1 by passing the bolts 9 through the bolt passage apertures of the bolt passage members 13 from the first longitudinal end and fastening the bolts 9 into the internal screw thread portions 1b that are formed on the fixing portions 1a.

Moreover, the stator 5A according to Embodiment 2 is configured in a similar or identical manner to Embodiment 1 above except that the bolt passage members 13 are used instead of the bolt passage members 11.

Consequently, similar or identical effects to those of Embodiment 1 above can also be achieved in Embodiment 2.

According to Embodiment 2, because the bolt passage members 13 are formed using sheet metal, cost reductions can be achieved. Because the bolt passage members 13 are joined onto the frame 10 by spot welding, welding time is shortened, enabling cost reductions to be achieved.

Embodiment 3

Figure 8:
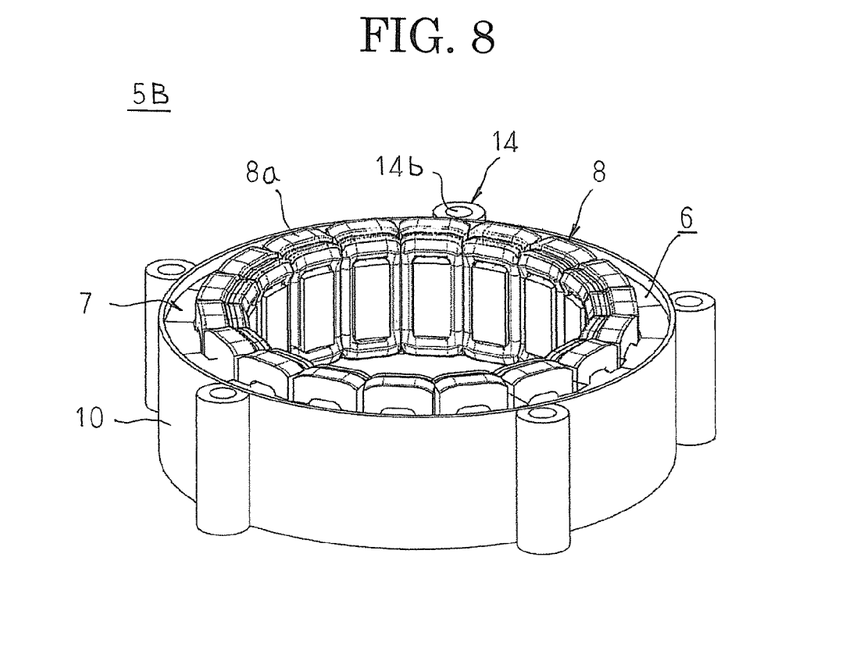
FIG. 8 is a perspective that shows a stator in a rotary electric machine according to Embodiment 3 of the present invention.

FIG. 8 is a perspective that shows a stator in a rotary electric machine according to Embodiment 3 of the present invention.

In FIG. 8, bolt passage members 14 are configured in a similar or identical manner to the above-mentioned bolt passage members 11 except that an axial length thereof is equal to an axial length of a frame 10. Core blocks 7 onto which concentrated winding coils 8a have been wound are arranged into an annular shape by abutting together circumferential side surfaces of yoke portions 7a, and are inserted into and fixed to the frame 10 by press fitting or shrinkage fitting. Mounting surfaces (not shown) of the bolt passage members 14 are placed on an outer circumferential surface of the frame 10 such that two longitudinal end surfaces are flush with two end surfaces of the frame 10, and the bolt passage members 14 are joined to the frame 10 by TIG welding to assemble a stator 5B.

A stator 5B that is assembled in this manner is held on the housing 1 by passing the bolts 9 through the bolt passage apertures 14b of the bolt passage members 14 from the first longitudinal end and fastening the bolts 9 into the internal screw thread portions 1b that are formed on the fixing portions 1a.

Moreover, the stator 5B according to Embodiment 3 is configured in a similar or identical manner to Embodiment 1 above except that the bolt passage members 14 are used instead of the bolt passage members 11.

Consequently, similar or identical effects to those of Embodiment 1 above can also be achieved in Embodiment 3.

In Embodiment 3, because the bolt passage members 14 are joined to the outer circumferential surface of the frame 10 by welding so as to be flush with the two end surfaces of the frame 10, first end surfaces of the bolt passage members 14 and a first end surface of the frame 10 constitute a first seat that contacts the bolt seats, and second end surfaces of the bolt passage members 14 and a second end surface of the frame 10 constitute a second seat that contacts the seating surfaces around the internal screw thread portions 1b. Thus, because axial fastening forces from the bolts 9 act on both the bolt passage members 14 and the frame 10, shearing forces do not arise in the joined portions between the bolt passage members 14 and the frame 10 when the rotary electric machine is subjected to mechanical shocks such as vibration. Consequently, because the joint strength between the bolt passage members 14 and the frame 10 can be reduced, welded points can be reduced, enabling labor time for integrating the bolt passage members 14 and the frame 10 to be shortened, thereby enabling cost reductions to be achieved.

Embodiment 4

Figure 9:
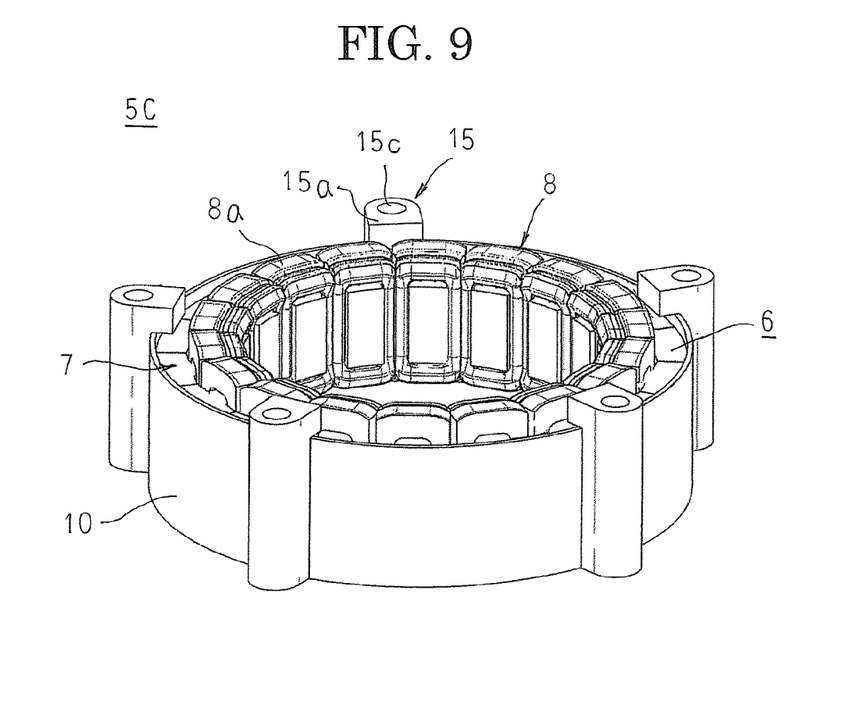
FIG. 9 is a perspective that shows a stator in a rotary electric machine according to Embodiment 4 of the present invention.
Figure 10:
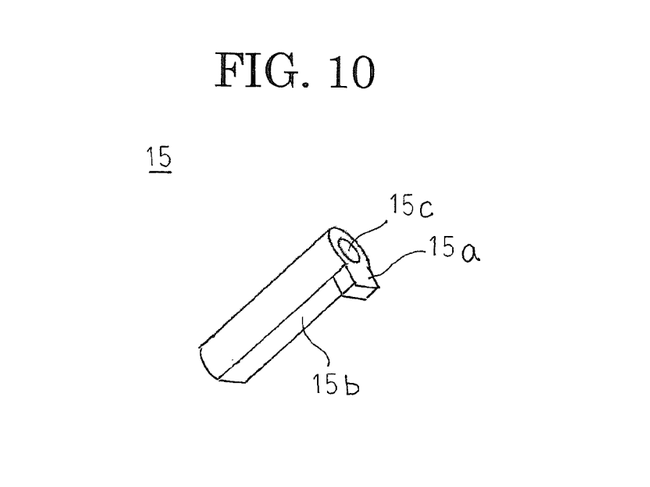
FIG. 10 is a perspective that shows a bolt passage member in the rotary electric machine according to Embodiment 4 of the present invention.

FIG. 9 is a perspective that shows a stator in a rotary electric machine according to Embodiment 4 of the present invention, and FIG. 10 is a perspective that shows a bolt passage member in the rotary electric machine according to Embodiment 4 of the present invention.

In FIGS. 9 and 10, bolt passage members 15 are produced by forging into tubular bodies that have an axial length that is longer than an axial length of a frame 10. Protruding portions 15a are formed so as to protrude radially outward from first axial end portions of the bolt passage members 15, and mounting surfaces 15b are formed so as to extend on portions of the outer circumferential surfaces of the bolt passage members 15 from a second axial end to root portions of the protruding portions 15a. These mounting surfaces 15b are curved surfaces that have an identical radius of curvature to the outer circumferential surface of the frame 10, and two longitudinal end surfaces of the bolt passage members 15 are formed into flat surfaces that are perpendicular to the longitudinal direction.

Core blocks 7 onto which concentrated winding coils 8a have been wound are arranged into an annular shape by abutting together circumferential side surfaces of yoke portions 7a, and are inserted into and fixed to the frame 10 by press fitting or shrinkage fitting. The mounting surfaces 15b of the bolt passage members 15 are placed on an outer circumferential surface of the frame 10 such that the protruding portions 15a are positioned axially outside the yoke portions 7a of the core blocks 7, and the bolt passage members 15 are joined to the frame 10 by TIG welding to assemble a stator 5C.

A stator 5C that is assembled in this manner is held on the housing 1 by passing the bolts 9 through the bolt passage apertures 15c of the bolt passage members 15 from the first longitudinal end and fastening the bolts 9 into the internal screw thread portions 1b that are formed on the fixing portions 1a.

Moreover, the stator 5C according to Embodiment 4 is configured in a similar or identical manner to Embodiment 1 above except that the bolt passage members 15 are used instead of the bolt passage members 11.

Consequently, similar or identical effects to those of Embodiment 1 above can also be achieved in Embodiment 4.

According to Embodiment 4, the protruding portions 15a project radially inward from the first axial end portions of the bolt passage members 15 so as to be positioned axially outside the yoke portions 7a of the core blocks 7. Thus, the area of the first seat that the bolt seats contact can be sufficiently ensured even if the bolt passage apertures 15c are disposed closer to the frame 10.

Embodiment 5

Figure 11:
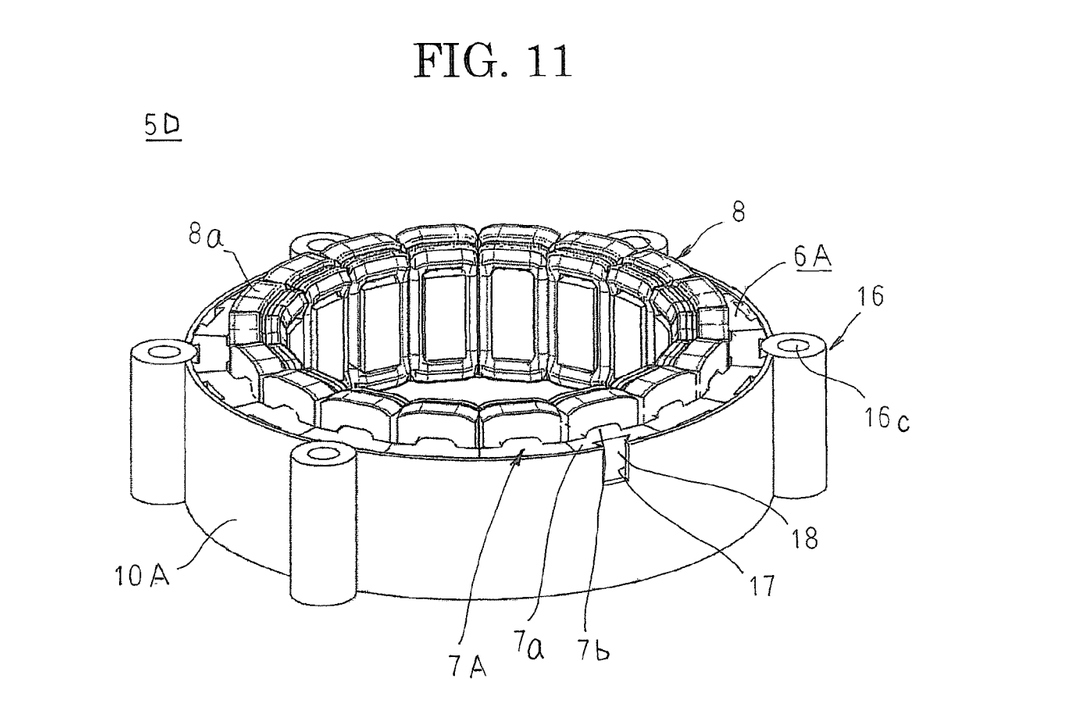
FIG. 11 is a perspective that shows a stator in a rotary electric machine according to Embodiment 5 of the present invention.
Figure 12:
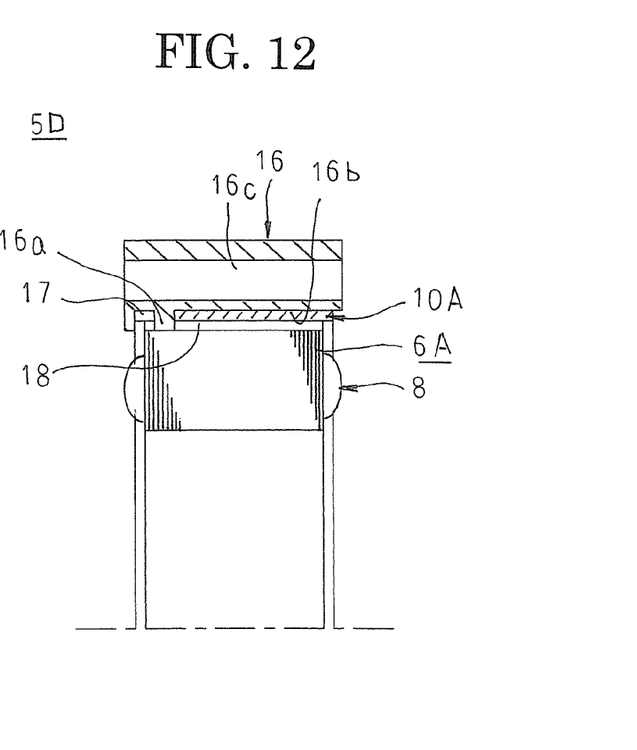
FIG. 12 is a half section that shows a stator in a rotary electric machine according to Embodiment 5 of the present invention.
Figure 13:
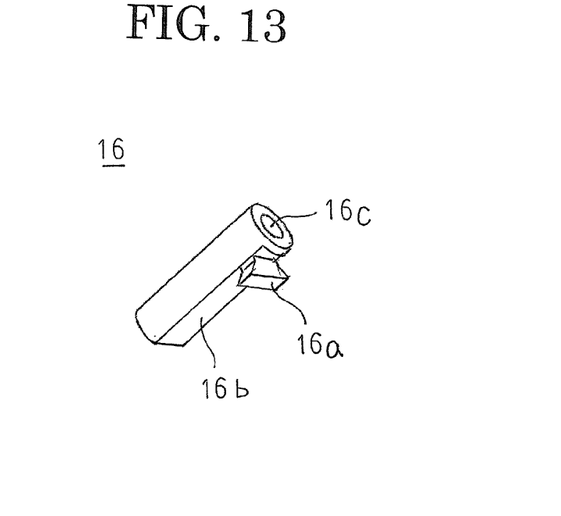
FIG. 13 is a perspective that shows a bolt passage member in the rotary electric machine according to Embodiment 5 of the present invention.

FIG. 11 is a perspective that shows a stator in a rotary electric machine according to Embodiment 5 of the present invention, FIG. 12 is a half section that shows a stator in a rotary electric machine according to Embodiment 5 of the present invention, and FIG. 13 is a perspective that shows a bolt passage member in the rotary electric machine according to Embodiment 5 of the present invention.

In FIGS. 11 through 13, a frame 10A is formed so as to have a cylindrical shape. Six notches 17 are each formed at a first axial end of the frame 10A so as to be arranged in a row circumferentially. Dovetail grooves 18 that have a trapezoidal cross section are formed on outer circumferential surfaces of yoke portions 7a of respective core blocks 7A so as to have a groove direction oriented in an axial direction and so as to extend from a first axial end to a second axial end. Bolt passage members 16 are produced by forging into tubular bodies that have an axial length which is longer than an axial length of the frame 10A. Interfitting portions 16a that have a trapezoidal cross section are formed so as to protrude radially outward from near first axial ends of the bolt passage members 16. Mounting surfaces 16b are formed so as to extend on portions of the outer circumferential surfaces of the bolt passage members 16 from a second axial end to root portions of the interfitting portions 16a. These mounting surfaces 16b are curved surfaces that have an identical radius of curvature to the outer circumferential surface of the frame 10A.

The core blocks 7A onto which concentrated winding coils 8a have been wound are arranged into an annular shape by abutting together circumferential side surfaces of the yoke portions 7a, and are inserted into and fixed to the frame 10A by press fitting or shrinkage fitting. Here, the frame 10A is positioned such that the notches 17 are positioned above the dovetail grooves 18. The dovetail grooves 18 are thereby covered by the frame 10A except near the first axial end. Then portions of the bolt passage members 16 near second axial ends of the mounting surfaces 16b are placed alongside the notches 17 of the frame 10A, and the bolt passage members 16 are moved toward the second axial end. The interfitting portions 16a are thereby fitted into the dovetail grooves 18 from the first axial end. Thus, the root portions of the interfitting portions 16a contact bottom portions of the notches 17 to prevent further movement of the bolt passage members 16 toward the second axial end. The mounting surfaces 16b of the bolt passage members 16 also contact the outer circumferential surface of the frame 10A. Then the bolt passage members 16e are joined to the outer circumferential surface of the frame 10A by TIG welding to assemble the stator 5D that is shown in FIG. 11.

A stator 5D that is assembled in this manner is held on the housing 1 by passing the bolts 9 through the bolt passage apertures 16c of the bolt passage members 16 from the first longitudinal end and fastening the bolts 9 into the internal screw thread portions 1b that are formed on the fixing portions 1a.

Consequently, similar or identical effects to those of Embodiment 1 above can also be achieved in Embodiment 5.

According to Embodiment 5, the interfitting portions 16a that are formed on the bolt passage members 16 are fitted into the dovetail grooves 18 that are formed on the outer circumferential surfaces of the yoke portions 7a of the core blocks 7A, and the bolt passage members 16 are TIG-welded to the frame 10A. Thus, because the interfitting portions 16a function as detents, and circumferential movement of the core blocks 7A that are arranged into an annular shape is prevented, the reliability of fixing of the core blocks 7A that are inserted into and fixed to the frame 10A is increased.

Moreover, in each of the above embodiments, concentrated winding coils are produced by winding conductor wire directly onto tooth portions of core blocks, but concentrated winding coils may also be produced by disposing bobbins that are produced using an insulating resin on two axial end surfaces of core blocks, and winding conductor wire around the tooth portions and the bobbins that are placed on the two end surfaces of the tooth portions.

In each of the above embodiments, a stator core is configured by arranging eighteen core blocks into an annular shape, but the number of core blocks that constitute the stator core is not limited to eighteen.

What is claimed is:

1. A rotary electric machine comprising:
a housing;
a rotor that is rotatably disposed inside said housing;
a stator that comprises:
a stator core that is configured by arranging a plurality of core blocks into an annular shape, said plurality of core blocks each being prepared by laminating and integrating a predetermined number of magnetic steel plates, and comprising a circular arc-shaped yoke portion, and a tooth portion that protrudes radially inward from an inner circumferential wall surface of said yoke portion; and
coils that are wound onto said tooth portions of each of said plurality of core blocks,
said stator being held on said housing so as to surround said rotor;
a frame that is produced so as to have a cylindrical shape, said plurality of core blocks that are arranged into said annular shape being inserted into and fixed to an internal portion thereof; and
a bolt passage member that is produced as a solid body, that is fixed to an outer circumferential surface of said frame by welding such that a longitudinal direction thereof is oriented in an axial direction of said frame, and that comprises a bolt passage aperture that passes through in said longitudinal direction,
wherein said stator is held on said housing by fastening a bolt that is passed through said bolt passage aperture from a first longitudinal end of said bolt passage member into a fixing portion that is formed on said housing
said bolt passage member is formed so as to protrude slightly beyond the first axial end of said frame; and
a protruding portion is formed so as to extend radially inward from a first axial end portion of said bolt passage member so as to be positioned axially outside said yoke portion.

2. The rotary electric machine according to claim 1, wherein said bolt passage member is produced using sheet metal.

3. The rotary electric machine according to claim 1, wherein a mounting surface of said bolt passage member that contacts said outer circumferential surface of said frame is formed so as to have a curved surface that has an identical radius of curvature to said outer circumferential surface of said frame.

4. A rotary electric machine comprising:
a housing;
a rotor that is rotatably disposed inside said housing;
a stator that comprises:
a stator that is configured by arranging a plurality of core blocks into an annular shape, said plurality of core blocks each being prepared by laminating and integrating a predetermined number of magnetic steel plates, and comprising a circular arc-shaped yoke portion, and a tooth portion that protrudes radially inward from an inner circumferential wall surface of said yoke portion; and
coils that are wound onto said tooth portions of each of said plurality of core blocks,
said stator being held on said housing so as to surround said rotor;
a frame that is produced so as to have a cylindrical shape, said plurality of core blocks that are arranged into said annular shape being inserted into and fixed to an internal portion thereof; and
a bolt passage member that is produced as a solid body, that is fixed to an outer circumferential surface of said frame by welding such that a longitudinal direction thereof is oriented in an axial direction of said frame, and that comprises a bolt passage aperture that passes through in said longitudinal direction,
wherein said stator is held on said housing by fastening a bolt that is passed through said bolt passage aperture from a first longitudinal end of said bolt passage member into a fixing portion that is formed on said housing;
a dovetail groove is formed on an outer circumferential surface of said yoke portion so as to have a groove direction oriented in an axial direction;
an interfitting portion is formed so as to protrude from an outer circumferential surface of said bolt passage member; and
said bolt passage member is fixed to said frame by said interfitting portion being fitted into said dovetail groove.

5. The rotary electric machine according to claim 4, wherein a mounting surface of said bolt passage member that contacts said outer circumferential surface of said frame is formed so as to have a curved surface that has an identical radius of curvature to said outer circumferential surface of said frame.

* * * * *